(12) United States Patent
Aiba (10) Patent No.: US 10,853,260 B2
(45) Date of Patent: Dec. 1, 2020

(54) INFORMATION PROCESSING DEVICE, STORAGE DEVICE, AND METHOD OF CALCULATING EVALUATION VALUE OF DATA STORAGE LOCATION

(71) Applicant: TOSHIBA MEMORY CORPORATION, Tokyo (JP)

(72) Inventor: Yuta Aiba, Yokohama Kanagawa (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 0 days.

(21) Appl. No.: 16/116,440

(22) Filed: Aug. 29, 2018

(65) Prior Publication Data

US 2019/0294555 A1 Sep. 26, 2019

(30) Foreign Application Priority Data

Mar. 20, 2018 (JP) .................................. 2018-053306

(51) Int. Cl.
*G06F 3/06* (2006.01)
*G06F 12/1009* (2016.01)
*G06F 12/0884* (2016.01)
*G06F 12/02* (2006.01)

(52) U.S. Cl.
CPC ...... *G06F 12/1009* (2013.01); *G06F 12/0246* (2013.01); *G06F 12/0884* (2013.01); *G06F 3/067* (2013.01); *G06F 3/0647* (2013.01)

(58) Field of Classification Search
None
See application file for complete search history.

(56) References Cited

U.S. PATENT DOCUMENTS

| 9,098,419 | B1 * | 8/2015 | Fair .......................... G06F 3/061 |
| 9,747,293 | B2 * | 8/2017 | Hazel ..................... G06F 16/134 |
| 9,779,021 | B2 | 10/2017 | Camp et al. |
| 2014/0173178 | A1 | 6/2014 | Schwartz |
| 2017/0075807 | A1 | 3/2017 | Tomlin et al. |

* cited by examiner

*Primary Examiner* — Brian R Peugh
(74) *Attorney, Agent, or Firm* — Kim & Stewart LLP (57) ABSTRACT

According to one embodiment, an information processing device includes a processor configured to refer to address conversion data. The address conversion data has a plurality of logical addresses associated with a plurality of physical addresses of a storage device. The processor converts the plurality of logical addresses of an evaluation target in storage device into the corresponding plurality of physical addresses for the evaluation target by referring to the address conversion data. The processor then calculates an evaluation value indicating a parallel reading performance for the plurality of physical addresses of the evaluation target using a parameter specifying a number of areas of the storage device readable in parallel.

18 Claims, 9 Drawing Sheets

INFORMATION PROCESSING DEVICE, STORAGE DEVICE, AND METHOD OF CALCULATING EVALUATION VALUE OF DATA STORAGE LOCATION

CROSS-REFERENCE TO RELATED APPLICATION

This application is based upon and claims the benefit of priority from Japanese Patent Application No. 2018-053306, filed Mar. 20, 2018, the entire contents of which are incorporated herein by reference.

FIELD

Embodiments described herein relate generally to an information processing device, a storage device, and a method of calculating an evaluation value of a data storage location.

BACKGROUND

Storage devices including a non-volatile memory have been used as a main storage unit in various information processing devices.

In addition, sharing the memory between the information processing device and the storage device is known. It is considered possible to improve the performance of the storage device by storing some data used by the storage device's controller in the memory of the information processing device.

DETAILED DESCRIPTION

Embodiments provide an information processing device and a storage device having increased efficiency in the reading of data from a non-volatile memory and an improved method of calculating an evaluation value of a data storage location for increasing efficiency in the reading of data form a non-volatile memory.

In general, according to one embodiment, an information processing device includes a processor configured to refer to address conversion data. The address conversion data has a plurality of logical addresses associated with a plurality of physical addresses of a storage device. The processor converts the plurality of logical addresses of an evaluation target, such as a file or a plurality of files, in the storage device into the corresponding plurality of physical addresses for the evaluation target by reference to the address conversion data. The processor then calculates an evaluation value indicating a parallel reading performance for the plurality of physical addresses of the evaluation target using a parameter specifying a number of areas of the storage device readable in parallel.

Hereinafter, example embodiments will be described with reference to drawings. In the following description, components having approximately the same or the same functions and configurations are denoted with the same reference numerals and repeated description thereof may be omitted.

First Embodiment

A computer system according to the embodiment calculates an evaluation value and relocates data based on the evaluation value so as to increase parallelism in reading data from a nonvolatile memory of the computer system.

In the first embodiment, the "evaluation value" corresponds to a predicted value for the number of times data will be read in a non-parallel manner from a physical address group (plurality of physical addresses) of an evaluation target.

In the first embodiment, the evaluation targets are individual files, but the present disclosure is not limited thereto. The evaluation target may be a directory of files or the like.

Figure 1:
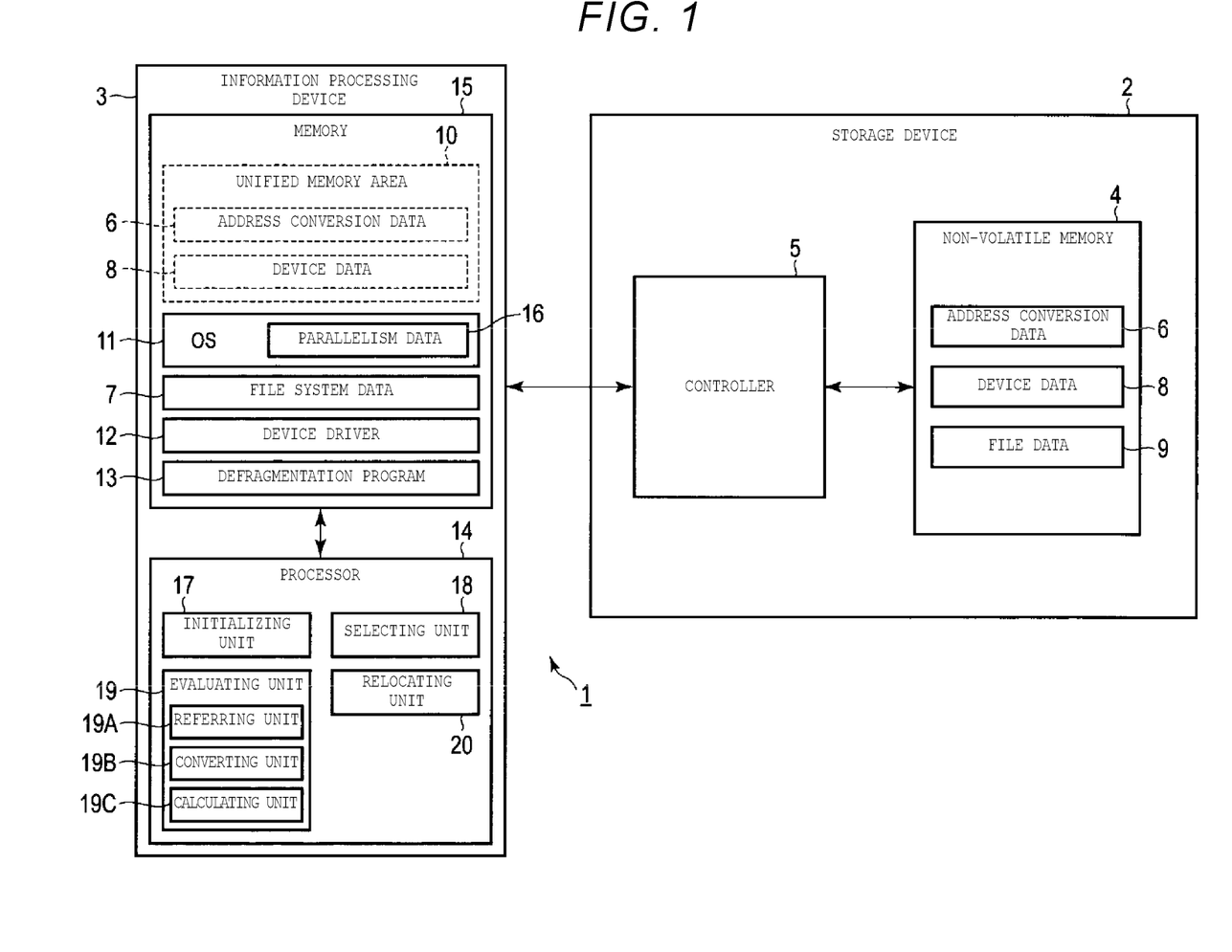
FIG. 1 is a block diagram illustrating a configuration of a computer system according to a first embodiment.

FIG. 1 is a block diagram illustrating an example of a configuration of a computer system 1.

The computer system 1 includes a storage device 2 and an information processing device 3.

The storage device 2 includes a non-volatile memory 4 and a controller 5. For example, the storage device 2 may be a solid state drive (SSD).

As the non-volatile memory 4, a NAND flash memory or the like can be used. In addition, the non-volatile memory 4 may be another type of a memory that is accessible simultaneously, in parallel, at a plurality of locations such as a magnetoresistive random access memory (MRAM). The non-volatile memory 4 is parallelizable.

Figure 2:
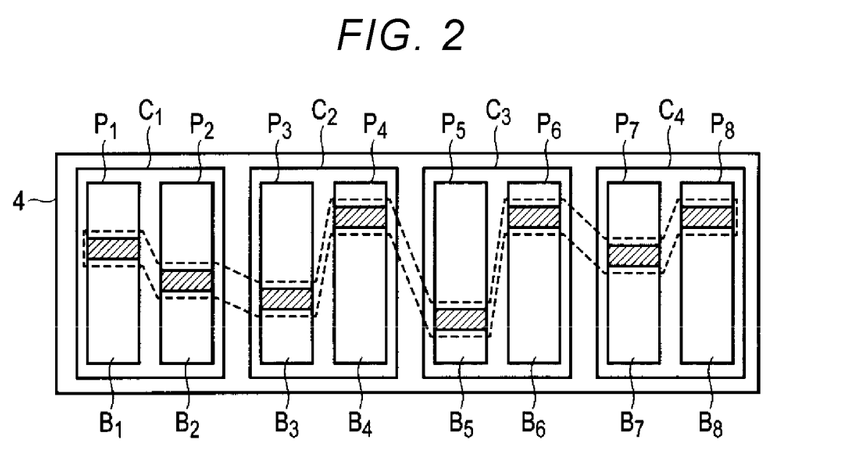
FIG. 2 is a block diagram illustrating a configuration of a non-volatile memory provided in a storage device.

FIG. 2 is a block diagram illustrating an example of a configuration of the non-volatile memory 4 provided in the storage device 2.

The non-volatile memory 4 includes, for example, a plurality of memory chips $C_1$ to $C_4$. The memory chip $C_1$ includes planes $P_1$ and $P_2$, the memory chip $C_2$ includes planes $P_3$ and $P_4$, the memory chip $C_3$ includes planes $P_5$ and $P_6$, and the memory chip $C_4$ includes planes $P_7$ and $P_8$. Each of the planes $P_1$ to $P_8$ includes block groups $B_1$ to $B_8$. Each block group comprises a plurality of blocks. Here, it is assumed that the blocks are physical blocks. In the first embodiment, it is assumed that writing or reading can be performed in parallel on the block groups $B_1$ to $B_8$ corresponding to the plurality of planes $P_1$ to $P_8$. Each block includes a plurality of pages. The writing of data to the non-volatile memory 4 may be referred to as "program"

operation or step. In the non-volatile memory 4, data can be deleted on a per block basis and or data can be written/read on per a page basis.

In the first embodiment, each memory chip ($C_1$-$C_4$) includes two different planes, and reading can be performed in parallel on eight block groups ($B_1$-$B_8$) corresponding to the different planes ($P_1$-$P_8$), but if the non-volatile memory 4 includes different number areas readable in parallel, then the numbers can be appropriately modified.

In the first embodiment, the data can be read in parallel from each of the block groups $B_1$ to $B_8$, so that the number of the block groups $B_1$ to $B_8$ readable in parallel matches a physical structure of the non-volatile memory 4. In general, the data read by a read command is relocated so as to be as scattered among the block groups $B_1$ to $B_8$ as much as possible in page units, so that as much data can be read in parallel as possible. By this method, it is possible to improve the reading efficiency, which corresponds to speed in reading multipage data.

In the embodiment, the number of the block groups $B_1$ to $B_8$ readable in parallel is set to an internal parallel number M (=8). The k-th block group is represented as $B_k$. In FIG. 2, k is one of 1, 2, 3, 4, 5, 6, 7, and 8. It is assumed that a data volume of an overall file to be evaluated is X bytes. Then, it is assumed that a data volume of one page is Y bytes.

As illustrated in FIG. 1, for example, the non-volatile memory 4 stores address conversion data 6, device data 8, file data 9.

The address conversion data 6 includes, for example, a plurality of logical addresses and the plurality of physical addresses in the non-volatile memory 4 in association with each other. More specifically, the address conversion data 6 may be, for example, a logical/physical address management table. By using the address conversion data 6, it is possible to convert the logical address designated by the information processing device 3 into the physical address. The address conversion data 6 includes the logical address related to the file to be evaluated and the physical address related to the file to be evaluated.

For example, the logical address may be logical block addressing (LBA) and the physical address may be physical block addressing (PBA).

The device data 8 includes information specifying the plurality of areas (block groups $B_1$ to $B_8$ in embodiment) readable in parallel in the non-volatile memory 4. For example, the device data 8 includes information on parallelism of the non-volatile memory 4 and information related to attribution of the physical addressing. As a specific example, physical address information indicating which areas are readable in parallel and information indicating which pages the physical address belongs to. By using the device data 8, it is possible to identify the physical addresses readable in parallel.

The device data 8 may be stored in the controller 5 instead of the non-volatile memory 4. The device data 8 may be stored in any memory of the information processing device 3, an operation system (OS) 11, or a device driver 12. For example, the device data 8 may be obtained by a processor 14 that executes a defragmentation program 13 of the information processing device 3 when power is supplied to the information processing device 3. More specifically, for example, the defragmentation program 13 may determine the device data 8 based on an item number of the storage device 2 or the like and the defragmentation program 13 may obtain the device data 8 from the device driver 12 by request.

The file data 9 is data written to the non-volatile memory 4 and may be, for example, document data, image data, or the like.

The controller 5 receives a command, data, information, an address, a signal, or the like from the information processing device 3 and transmits the command, the data, the information, the address, the signal, or the like to the information processing device 3 to control the non-volatile memory 4. More specifically, for example, the controller 5 receives a read command and a logical address from the information processing device 3, converts the logical address into the physical address by using the address conversion data 6, and reads the data at the location indicated by the physical address of the non-volatile memory 4. Then, the controller 5 transmits the read data to the information processing device 3.

The controller 5 can cache various pieces of data, such as the address conversion data 6, the device data 8, or the like in the non-volatile memory 4 within a unified memory area 10 of the memory 15 of the information processing device 3. Then, the controller 5 may refer to these various pieces of cached data and execute various processes.

In this way, the various pieces of data such as the address conversion data 6, the device data 8, and the like are cached within the unified memory area 10, but, the information processing device 3 may also transmit to the storage device 2 a vendor-specific (e.g., a device manufacturer-specific or otherwise exclusive) command for requesting the data, may store the data received from the storage device 2 in another memory area instead of the unified memory area 10, and may use the data in the same manner as the second embodiment described below.

The information processing device 3 is communicably connected to the storage device 2. The information processing device 3 functions, for example, as a host device of the storage device 2. For example, the information processing device 3 may include the storage device 2 or may externally connect to the storage device 2. The information processing device 3 includes the memory 15 and the processor 14.

The memory 15 may be used by the processor 14 as a cache memory. As the memory 15, for example, a dynamic random access memory (DRAM) is used.

The memory 15 may include a plurality of memories and, for example, both a non-volatile memory and a volatile memory.

In this first embodiment, the memory 15 includes the unified memory area 10. The unified memory area 10 can be shared with other devices such as the storage device 2 and the like.

As described above, for example, the address conversion data 6 and the device data 8 received by the information processing device 3 from the storage device 2 may be cached in the unified memory area 10.

For example, the memory 15 stores the OS 11, file system data 7, the device driver 12, and the defragmentation program 13 used for the information processing device 3. However, a part or all of the OS 11, the file system data 7, the device driver 12, and the defragmentation program 13 may also or instead be stored in another memory of the information processing device 3 and may be read from the storage device 2 and stored in the memory 15 or another memory of the information processing device 3 as necessary.

For example, the memory 15 may store the evaluation value calculated by the defragmentation program 13 when executed by the processor 14.

The processor 14 executes the OS 11, the device driver 12, and the defragmentation program 13.

The OS 11 also may include parallelism data 16. For example, the parallelism data 16 includes information related to the reading parallelism of the OS 11 used for the information processing device 3. More specifically, the parallelism data 16 includes a queue depth indicating the amount of I/O (input/output data) which the storage device 2 can process at one time and a command chunk size, which is a size into which the data is divided. The OS 11 and the parallelism data 16 may be separately stored and managed.

The file system data 7 includes information representing a relationship between a file and a directory written to the non-volatile memory 4 and the logical address of the information, and is managed by the OS 11. The directory may be, for example, a folder.

The device driver 12 is software for enabling the storage device 2 to be controlled by the OS 11.

The defragmentation program 13 refers to the address conversion data 6 and the device data 8 cached in the unified memory area 10 and the file system data 7 managed by the OS 11 on the memory 15. The defragmentation program 13 selects the file to be evaluated, converts a logical address group of the evaluation target in a logical address space of the file to be evaluated into the physical address group, and calculates the number of non-parallel readings required to read the file, which is a parameter value P, from the physical address group(s). Here, reading in parallel means that execution times of reading operations overlap with one another and non-parallel reading means that execution times of reading operations do not overlap with one another (occur in a sequentially, for example.

In a case where the number of non-parallel readings required is larger than a threshold value, the defragmentation program 13 relocates (rewrites) the data from one physical address group location to another location to improve reading performance. The relocation of the data for improving the reading performance may be referred to as optimization. The controller 5 of the storage device 2 may relocate the data according to a command from the defragmentation program 13 and the defragmentation program 13 may relocate the data.

The processor 14 functions as an initializing unit 17, a selecting unit 18, an evaluating unit 19, and a relocating unit 20 when executing the defragmentation program 13.

In the embodiment, an optimization target may be the file or the directory as described above or may be an entire drive or other division of the storage device 2.

For example, the initializing unit 17 obtains the file system data 7, the device data 8, the parallelism data 16 used for the OS 11, and an address of the address conversion data 6, which is a reference destination, from the storage device 2 or the memory 15. In addition, the initializing unit 17 initializes the selecting unit 18, the evaluating unit 19, and the relocating unit 20. The initializing unit 17 sets the file system data 7 and the parallelism data 16 for the selecting unit 18 and sets the data included in the device data 8 and the address of the address conversion data 6 for the evaluating unit 19.

For example, when the non-volatile memory 4 has a configuration depicted in FIG. 2, the device data 8 can be read the data in parallel for four chips, two planes in each of the chips, and the internal parallel number is thus M=8, and the block groups $B_1$ to $B_8$ can be read by the storage device 2 at one time in a page size of Y bytes. The initializing unit 17 sets the data included in the device data 8 for the evaluating unit 19.

For example, according to setting by the initializing unit 17, the selecting unit 18 obtains the file system data 7 of the memory 15 and obtains a structure of the file and a file list from the obtained file system data 7. The selecting unit 18 selects the file to be evaluated from the file list. Here, the file to be evaluated can be appropriately selected or may be designated by a user.

The selecting unit 18 obtains the logical address space of the file to be evaluated from the file system data 7.

According to setting by the initializing unit 17, the selecting unit 18 obtains the parallelism data 16 of the memory 15 and divides the logical address space corresponding to the file into reading units to obtain a plurality of logical address groups. Here, the reading units are a data unit for parallel reading from the storage device 2 according to the read command issued by the information processing device 3. In this embodiment, each logical address group is one unit of the logical address group of the evaluation target.

Figure 3:
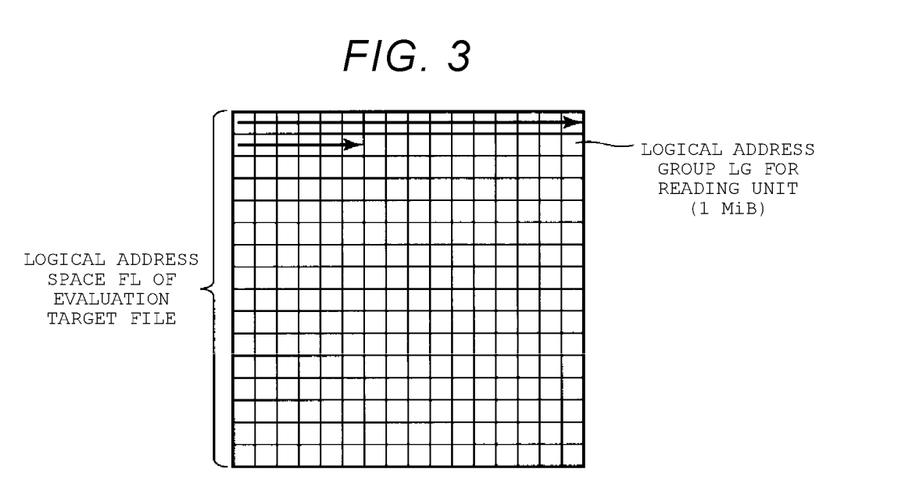
FIG. 3 is a diagram illustrating an example of a divided state of a logical address space of a file to be evaluated according to the first embodiment.

FIG. 3 is a diagram illustrating division of a logical address space FL of a file to be evaluated. In the example of FIG. 3, the logical address space FL is conceptually represented by a rectangle divided into a two-dimensional matrix. It is assumed that each depicted sub-division of the logical address space FL is one reading unit, that is, a logical address group LG. For example, the selecting unit 18 selects the logical address groups LG in order from the left to the right in a first row of the logical address space FL illustrated in a matrix form, then selects the logical address group in order from the left to the right in a second row, and etc.

For example, in a case where the parallelism data 16 indicates a queue depth=1 and the command chunk size=1 MiB, the selecting unit 18 divides the logical address space FL corresponding to the file to be evaluated by 1 MiB and sets the logical address group LG of the evaluation target as 1 MiB. Then, the selecting unit 18 provides the logical address groups LG of the evaluation target to the evaluating unit 19 and the relocating unit 20.

The evaluating unit 19 illustrated in FIG. 1 is set based on the device data 8 by the initializing unit 17 and obtains contents of the device data 8. In addition, according to setting by the initializing unit 17, the evaluating unit 19 obtains the address of the address conversion data 6 of the memory 15 and converts each logical address group LG of the evaluation target into a physical address group by using the address conversion data 6. Then, the evaluating unit 19 evaluates a degree of location of data not being read in parallel in time in the storage device 2 by using the contents of the device data 8 regarding the physical address group obtained by converting the logical address group LG.

The evaluating unit 19 includes, for example, a referring unit 19A, a converting unit 19B, and a calculating unit 19C.

The referring unit 19A refers to the address conversion data 6 cached in the unified memory area 10 of the memory 15.

The converting unit 19B converts the logical address group LG of the evaluation target into the physical address group by using the address conversion data 6.

The calculating unit 19C evaluates a bias of each of locations indicated by the physical address group and data effectiveness in the page by using a setting content based on the device data 8.

Here, the data effectiveness is represented by Z/Y. Z is the amount (e.g., in bytes) of the data to be read from the information processing device 3 per page. As described above, Y is a data volume (e.g., in bytes) of a page and is, for example, a data unit by which the storage device 2 performs reading from the non-volatile memory 4.

For example, the calculating unit 19C can specify a particular page of the non-volatile memory 4 to which the data has been written and a parallelization unit (for example, one of the block groups $B_k$) to which the data belongs according to its physical address. As a specific example, the calculating unit 19C calculates the parameter value P as the evaluation value for evaluating the bias of each of the locations indicated by the physical address group and the data effectiveness in the page. Then, the calculating unit 19C provides the parameter value P to the relocating unit 20.

Figure 4:
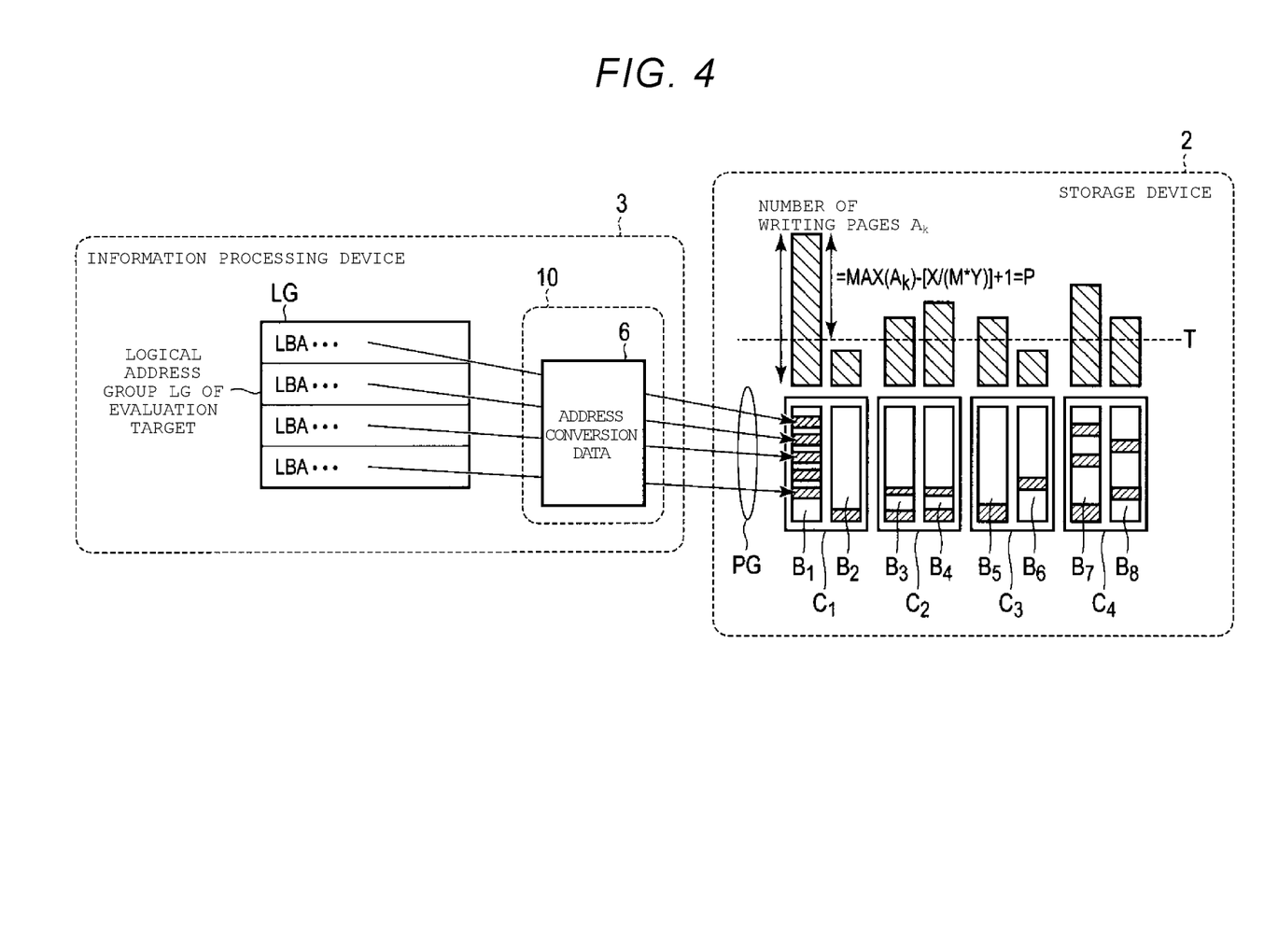
FIG. 4 is a diagram illustrating an example of a relationship between a state of writing to a non-volatile memory based on a logical address group of an evaluation target and an evaluation value.

FIG. 4 is a diagram illustrating an example of a relationship between a state of writing to the non-volatile memory 4 based on the logical address group LG of the evaluation target and the parameter value P.

The parameter value P is a value obtained from the formula $P=MAX(A_k)-[X/(M\times Y)]+1$ when the number of elements of a subset belonging to the block group $B_k$ in a physical address group PG obtained by converting the logical address group LG is $A_k$. Here, [ ] (square brackets) is a Gaussian sign. The calculation means that as the parameter value P becomes larger, it will be necessary to read the data in a non-parallel manner from the non-volatile memory 4. In the example of FIG. 4, the data indicated by the physical address group PG is biased to a block group $B_1$ and reading data from the block group $B_1$ can become a bottleneck in performance when the data is read from the physical address group PG. An ideal value of the parameter value P is zero. Even if the non-volatile memory 4 receives a read command for sizes that are less than one page size, it still takes a read time of at least one page and as the number of times for readings with small data effectiveness increases, the data throughput (amount of data readable within predetermined time) decreases. The parameter value P can also evaluate the throughput along with a parallel reading performance.

The relocating unit 20 obtains the logical address group LG of the evaluation target from the selecting unit 18 and obtains the parameter value P from the evaluating unit 19. In a case where the parameter value P is equal to or larger than a threshold value T, that is, the number of times the data must be read from the non-volatile memory 4 in a non-parallel manner is equal to or larger than the threshold value T, the relocating unit 20 transmits a command for relocating the logical address group LG of the evaluation target to the controller 5 of the storage device 2. According to the command, the controller 5 converts the logical address group LG of the evaluation target into a physical address group PC by using the address conversion data 6 and reads the data corresponding to the physical address group PC from the non-volatile memory 4. Further, the controller 5 updates the address conversion data 6 and rewrites the read data to the non-volatile memory 4.

An example of relocating control by the relocating unit 20 and the controller 5 can be appropriately modified. For example, the location to which the data is relocated may be determined by the relocating unit 20 referring to the address conversion data 6 and the device data 8 or may be determined by the controller 5 so that the parameter value P is smaller than the threshold value T. For example, the relocating unit 20 may update the address conversion data 6 by the relocation or the controller 5 may update the address conversion data 6. For example, the relocating unit 20 may read the data to be relocated from the non-volatile memory 4 via the controller 5, may determine a relocation position of the data to be relocated so as to secure parallelism, and may write the data to be relocated to the relocation position of the non-volatile memory 4 via the controller 5.

Figure 5:
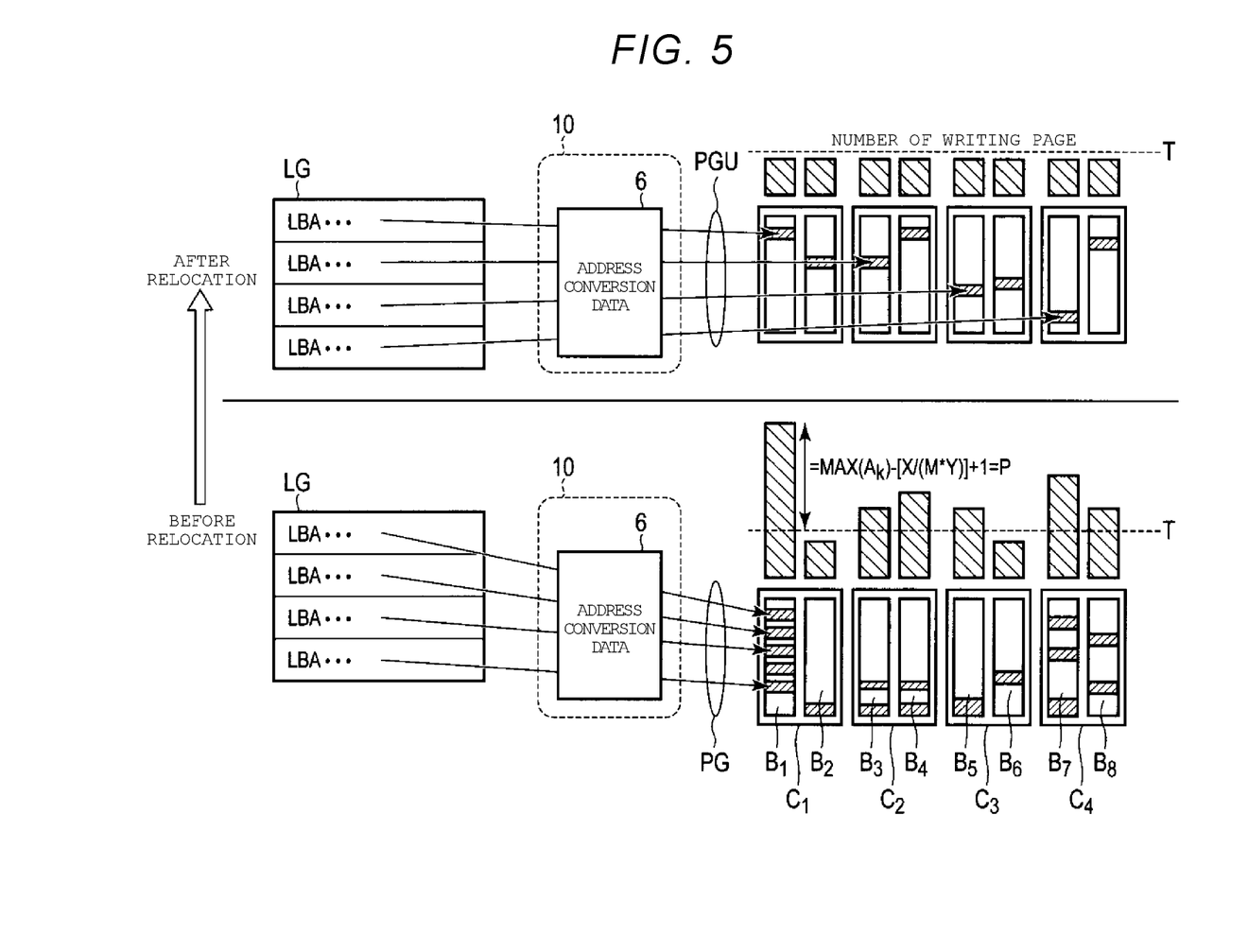
FIG. 5 is a diagram illustrating an example of writing states before and after relocation by a relocating unit.

FIG. 5 is a diagram illustrating an example of writing states before and after relocation by the relocating unit 20.

The logical address group LG of the evaluation target includes a plurality of logical addresses (LBA). The logical address group LG of the evaluation target is identified from the information processing device 3 to the storage device 2 in a read command. It is preferable that reading from the plurality of logical addresses included in the logical address group LG of the evaluation target is executed in parallel as much as possible.

Before the relocation, the data corresponding to the physical address group PG obtained by converting the logical address group LG of the evaluation target is biasedly located to the block group $B_1$. For this reason, the number of times the block group $B_1$ must be is larger than the number readings from any one of the block groups $B_2$ to $B_8$, so that non-parallel readings will frequently occur. In this case, the relocating unit 20 and the controller 5 update the physical address group PG corresponding to the logical address group LG of the evaluation target to a physical address group PGU so that the plurality of physical addresses are more evenly scattered amongst the plurality of block groups $B_1$ to $B_8$ and pieces of data to be read in parallel are inside the same page. The relocating unit 20 and the controller 5 update the address conversion data 6 based on the updated physical address group PGU and relocate (rewrite), that is, move the data to a location indicated by the updated physical address group PGU. Accordingly, the bias of the data, which can otherwise be a bottleneck for parallel reading, is removed; it is for more pieces of the data to be read in parallel by reading the data from the page.

In a case where the parameter value P is smaller than the threshold value T, the relocating unit 20 notifies the selecting unit 18 of a result. The selecting unit 18 selects the next logical address group of the evaluation target and provides the next logical address group of the evaluation target to the evaluating unit 19 and the relocating unit 20.

Figure 6:
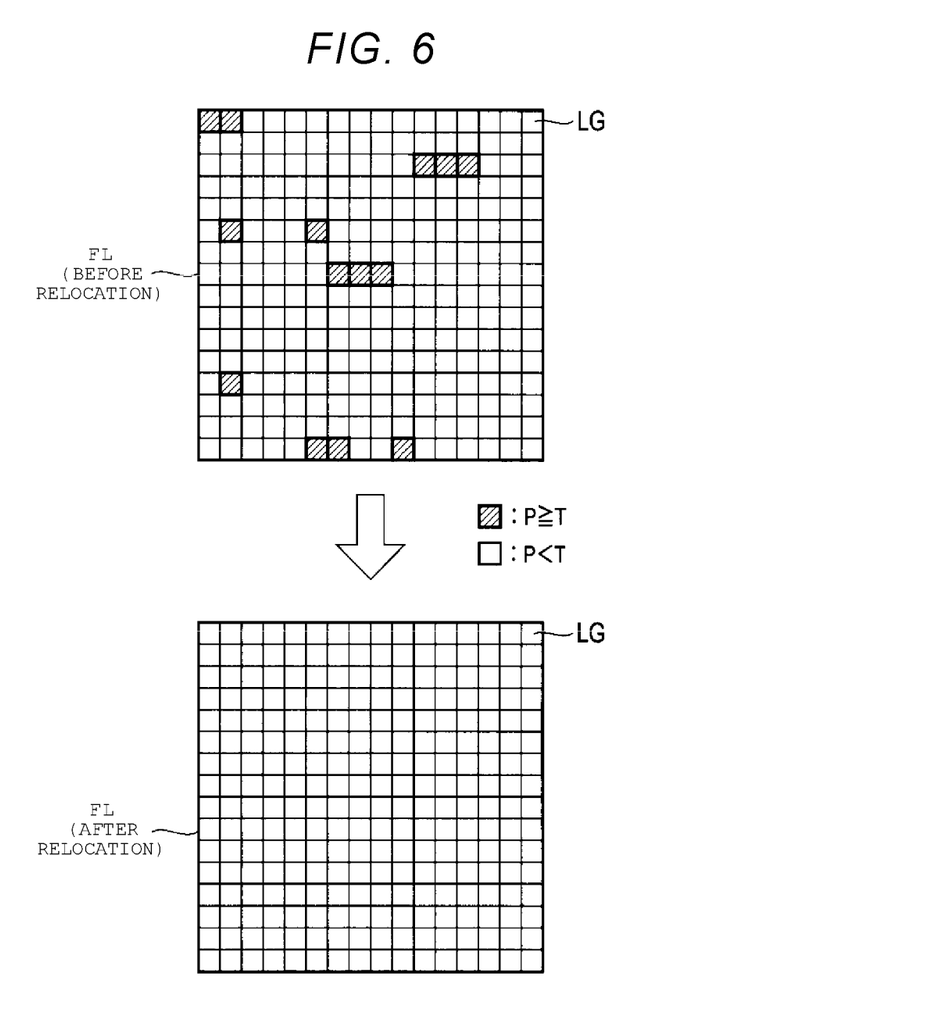
FIG. 6 is a diagram illustrating an example of changes in evaluation values before and after relocation by the relocating unit.

FIG. 6 is a diagram illustrating an example of changes in the parameter values P before and after relocation by the relocating unit 20. In the example of FIG. 6, the logical address space FL is illustrated under the same condition as the logical address space FL illustrated in FIG. 3 described above.

Among the logical address spaces FL before the relocation illustrated in the upper portion of FIG. 6, in the logical address group with oblique lines (shading hash lines), the parameter value P is equal to or larger than the threshold value T and the relocating unit 20 determines that it is necessary to relocate the logical address group of which the parameter value P is equal to or larger than the threshold value T. In the logical address group without oblique lines (no shading has lines0, the parameter value P is smaller than the threshold value T and it is not necessary to relocate the logical address group. As illustrated in the lower drawing of FIG. 6, after the relocation, it is preferable that the parameter values P of the logical address groups LG in all of the logical address spaces FL are smaller than the threshold value T.

Figure 7:
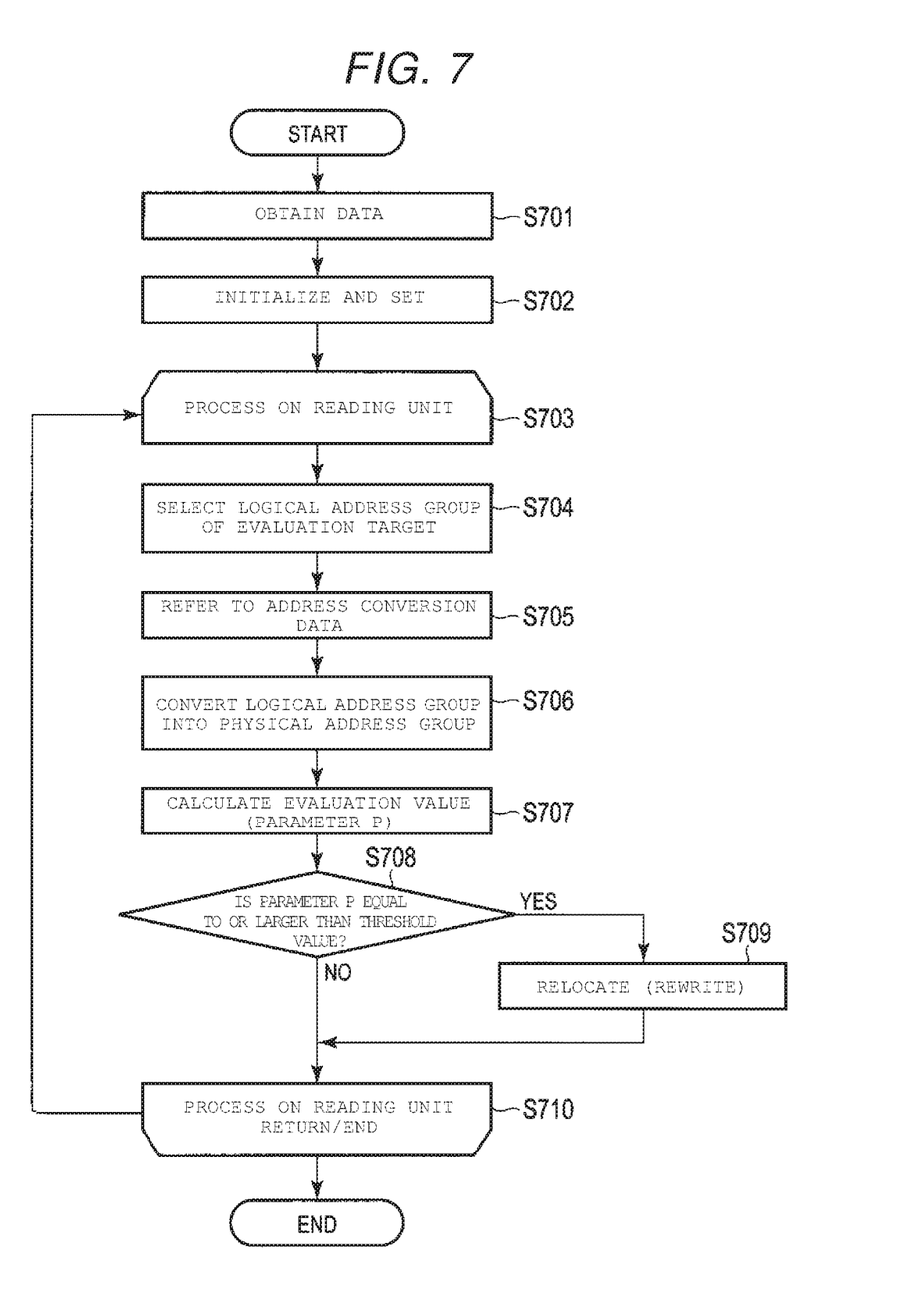
FIG. 7 is a flowchart illustrating a process executed by a defragmentation program according to the first embodiment.

FIG. 7 is a flowchart illustrating an example of a process executed by the defragmentation program 13 according to the embodiment.

In aspect S701, the initializing unit 17 obtains, for example, the file system data 7, the device data 8, the parallelism data 16, and the address of the address conversion data 6 from the storage device 2 or the memory 15.

In aspect S702, the initializing unit 17 initializes, for example, the selecting unit 18, the evaluating unit 19, and the relocating unit 20 and sets the necessary data for the selecting unit 18 and the evaluating unit 19 based on the obtained various pieces of data. Specifically, for example, the initializing unit 17 provides the file system data 7 and the parallelism data 16 to the selecting unit 18 and provides the data included in the device data 8 and the address of the address conversion data 6 to the evaluating unit 19.

Aspects S703 to S710 are repeatedly executed for the plurality of logical address groups of the evaluation target obtained by dividing the logical address space of the file into the reading units.

In aspect S704, the selecting unit 18 selects the logical address group of the evaluation target.

In aspect S705, the referring unit 19A of the evaluating unit 19 refers to the address conversion data 6.

In aspect S706, the converting unit 19B of the evaluating unit 19 converts the logical address group LG of the evaluation target into the physical address group PG by using the address conversion data 6.

In aspect S707, the calculating unit 19C of the evaluating unit 19 calculates the parameter value P indicating a dispersion level of optimum variation.

In aspect S708, the relocating unit 20 determines whether or not the parameter value P is equal to or larger than the threshold value T.

In a case where the parameter value P is smaller than the threshold value T, it is determined that the parallelism is sufficient at the location indicated by the physical address group PG and the process is moved to aspect S710.

In a case where the parameter value P is equal to or larger than the threshold value T, the relocating unit 20 transmits the command for relocating the logical address group LG of the evaluation target to the controller 5 of the storage device 2 in aspect S709. The controller 5 of the storage device 2 converts the logical address group LG of the evaluation target into the physical address group PG and reads the data written to the location indicated by the current physical address group PG so as to determine whether or not the parallelism is sufficient. Further, the controller 5 determines the physical address group PGU to be stored in the same page after updating as possible and writes the read data to the location indicated by the updated physical address group PGU. At this time, the controller 5 updates the address conversion data 6 based on the updated physical address group PGU. Some of operations of the controller 5 may be executed by the processor 14 of the information processing device 3.

In the example embodiment described above, it is possible to evaluate the parallel reading performance related to the data indicated by the physical address group PG of the evaluation target without issuing a read command from the information processing device 3 to the storage device 2 by use of data which the information processing device 3 can obtain.

In the embodiment, it is possible to evaluate the parallel reading performance and to relocate the data so as to increase parallel readings. Accordingly, in the embodiment, without issuing a read command, it is possible to evaluate and improve the parallel reading performance along a pattern to be read.

In the embodiment, each of various pieces of data stored in the storage device 2 is cached in the unified memory area 10 of the memory 15. Accordingly, the information processing device 3 can evaluate the parallel reading performance in the storage device 2 by using the various pieces of data stored in the storage device 2.

For example, in a mechanical storage device such as a hard disk drive (HDD), continuity of the logical address of the data affects a performance of a file system. For this reason, in the HDD, by relocating files so that the logical address of the data keeps continuity in a defragmentation process of the file system, a seek time of a disk head can be reduced and the performance restored. On the other hand, in a solid-state drive (SSD), it cannot be expected that reading performance will be improved by keeping continuity of logical addresses.

In the embodiment, the information processing device 3 obtains the data stored in the storage device 2 such as the address conversion data 6, the device data 8, or the like and stores the file system data 7, the parallelism data 16, or the like. Without the issuing of a read command to the storage device 2, the information processing device 3 can evaluate the reading performance according to a use case based on the obtained or stored various pieces of data. When it is determined that the performance is low, it is then possible to improve the reading performance by relocating the data.

In the embodiment, the data is relocated so that the data to be read in parallel will be located within the same page as much as possible. Accordingly, it is possible to increase the number of the pieces obtained by reading a page at one time in a parallel reading, to decrease the total number of times for reading, and to speed up the data reading process of the storage device 2.

Figure 8:
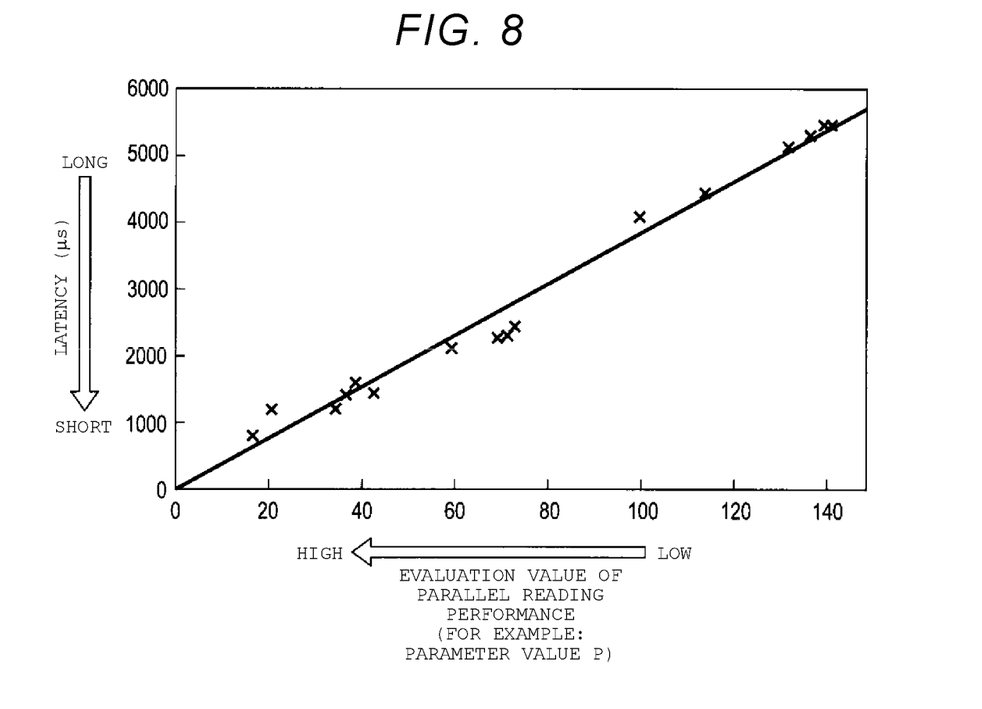
FIG. 8 is a graph an effect related to evaluation of a parallel reading performance according to the first embodiment.

FIG. 8 is a graph illustrating an example of effectiveness related to evaluation of the parallel reading performance according to the embodiment.

In FIG. 8, the horizontal axis is an evaluation value of the parallel reading performance, for example, the parameter value P. As a value of the horizontal axis decreases, the parallel reading performance is evaluated to be high.

A vertical axis in FIG. 8 is a latency time (microseconds) from when the read command is issued until a response (for example, read data) is received.

There is a correlation between the evaluation value and the latency time of the parallel reading performance according to the embodiment. In FIG. 8, as the parameter value P decreases, the latency time decreases. FIG. 8 illustrates that the parameter value P is effective as an evaluation metric of the parallel reading performance.

Second Embodiment

The second embodiment is a modification of the first embodiment described above.

In the first embodiment, each of various pieces of data (specifically, address conversion data 6 and device data 8) stored in the storage device 2 is cached in the unified memory area 10 of the memory 15. The information processing device 3 evaluates the parallel reading performance and relocates the data based on the evaluation by referring to the various pieces of data stored in the unified memory area 10.

On the other hand, in the second embodiment, the information processing device 3 might not include a unified memory area 10.

In the second embodiment, the information processing device 3 receives various pieces of necessary data from the storage device 2 by using an exclusive command (e.g., a vendor-specific command), stores the received data in a specific address range in the memory 15, and executes aspects S703 to S710, described above in FIG. 7, based on the various pieces of data stored in the memory 15. As a specific example, address conversion data 6 and device data 8 within specific range corresponding to the exclusive command might be received as the necessary pieces of data.

More specifically, for example, the initializing unit 17 may transmit the exclusive command for requesting the address conversion data 6 and the exclusive command for requesting the device data 8 to the storage device 2, may initialize the evaluating unit 19, and may set the evaluating unit 19 by using the address conversion data 6 and the device data 8 received from the storage device 2.

The information processing device 3 may manage some pieces of the address conversion data 6 and the device data 8 in the unified memory area 10, and may receive the other pieces of the address conversion data 6 and the device data 8 by the exclusive command and store the other pieces of the address conversion data 6 and the device data 8 in an area other than the unified memory area 10 in the memory 15. Then, the information processing device 3 may execute aspects S703 to S710 described above in FIG. 7 with reference to the memory 15.

In the second embodiment, even if the information processing device 3 does not include the unified memory area 10, substantially the same effect can be obtained as in the first embodiment.

In the second embodiment, for example, the initializing unit may transmit the exclusive command for requesting the parallelism data 16 and the file system data 7 to the storage device 2, may initialize the selecting unit 18, may set the selecting unit 18 by using the parallelism data 16 and the file system data 7 received from the storage device 2.

Third Embodiment

The present embodiment is a modification example of the first embodiment or the second embodiment described above.

In the embodiment, the evaluating unit 19 is provided in the storage device 2 instead of the information processing device 3.

Figure 9:
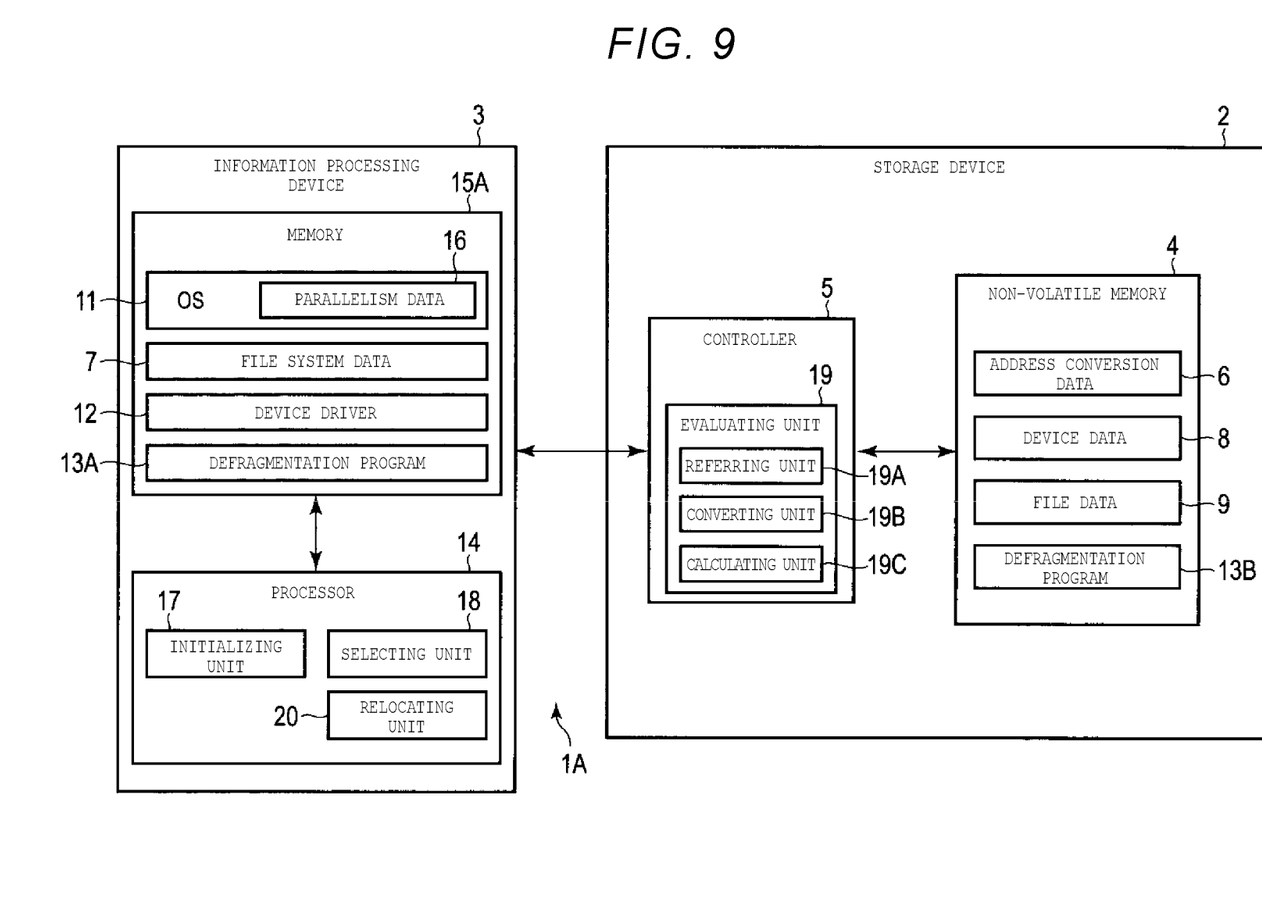
FIG. 9 is a block diagram illustrating a configuration of a computer system according to a third embodiment.

FIG. 9 is a block diagram illustrating an example of a configuration of a computer system 1A according to the embodiment.

In the computer system 1A, the processor 14 functions as the initializing unit 17, the selecting unit 18, and the relocating unit 20 by executing a defragmentation program 13A stored in a memory 15A.

The controller 5 functions as the evaluating unit 19 by executing a defragmentation program 13B stored in the non-volatile memory 4 or another memory (not illustrated) of the storage device 2.

Since the storage device 2 includes the evaluating unit 19, in the embodiment, it is not necessary to transmit the address conversion data 6 to the information processing device 3.

In the embodiment, for example, the initializing unit 17 obtains the device data 8 from the storage device 2 and initializes or sets the evaluating unit 19 of the storage device 2 by using the exclusive command.

In the embodiment, the selecting unit 18 notifies the logical address group LG of the evaluation target to the storage device 2 and transmits the exclusive command for requesting the evaluation value to the storage device 2.

The referring unit 19A of the evaluating unit 19 of the storage device 2 receives the logical address group LG of the evaluation target and the exclusive command and refers to the address conversion data 6 stored in the non-volatile memory 4 or another memory of the storage device 2.

The converting unit 19B of the evaluating unit 19 converts the logical address group LG of the evaluation target identified by the information processing device 3 into the physical address group PG by using the address conversion data 6 based on the received exclusive command.

The calculating unit 19C of the evaluating unit 19 calculates the parameter value P for the physical address group PG and transmits the parameter value P in response to the exclusive command to the relocating unit 20 of the information processing device 3.

The relocating unit 20 receives the parameter value P. In a case where the parameter value P is larger than the threshold value T, the relocating unit 20 transmits a relocating command for decreasing the parameter value P for the logical address group LG of the evaluation target below the threshold value T to the storage device 2.

As described, the same effect can be obtained by the same operation as in the first embodiment or the second embodiment, it is possible to disperse the processing between the information processing device 3 and the storage device 2, and transmission of the address conversion data 6 from the storage device 2 to the information processing device 3 can be omitted.

Fourth Embodiment

The fourth embodiment is a modification example of the third embodiment described above.

In the fourth embodiment, the relocating unit 20 is provided in the storage device 2 instead of the information processing device 3.

Figure 10:
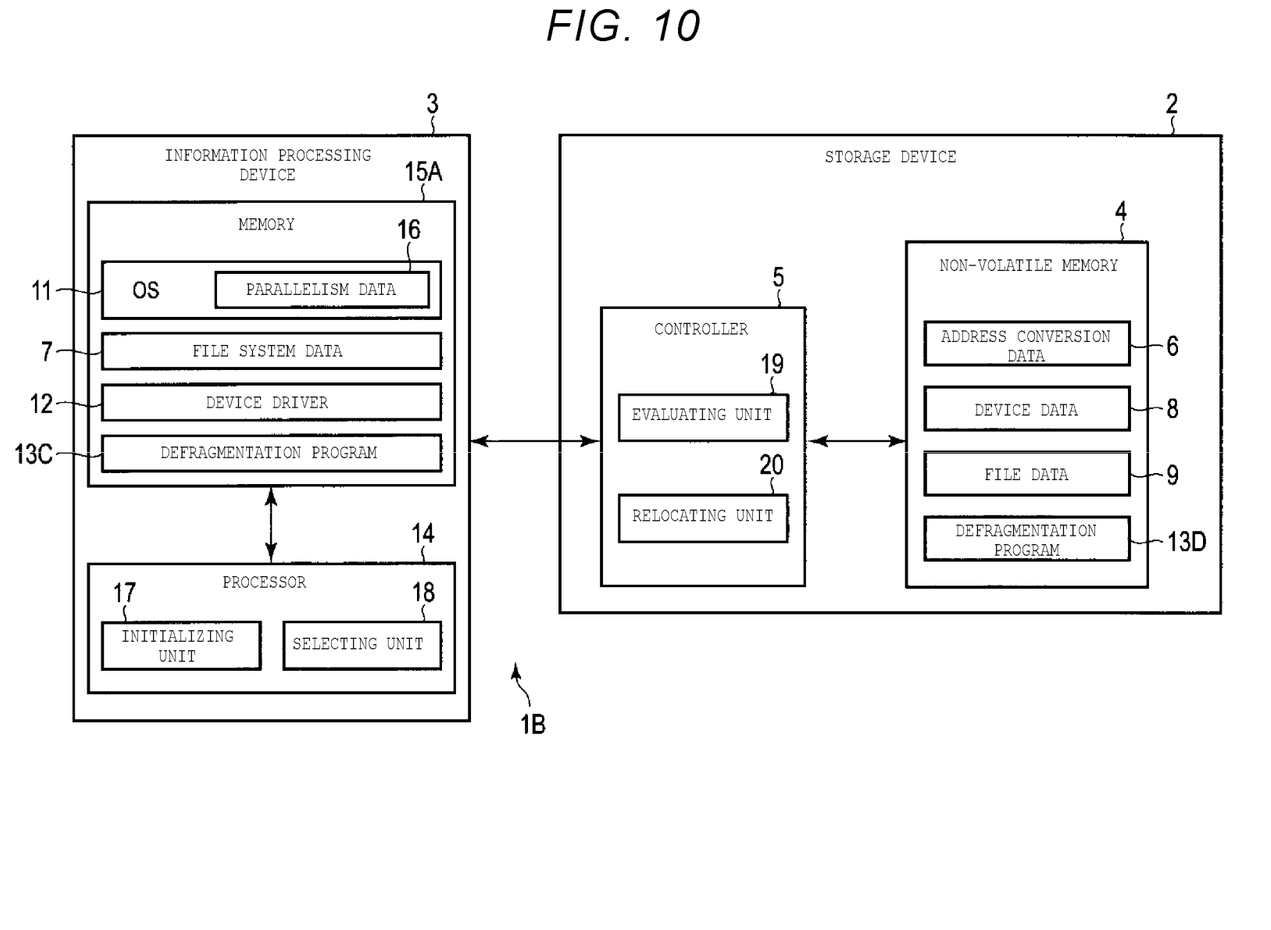
FIG. 10 is a block diagram illustrating an example of a configuration of a computer system according to a fourth embodiment.

FIG. 10 is a block diagram illustrating an example of a computer system 1B according to the fourth embodiment.

In the computer system 1B, the processor 14 functions as the initializing unit 17 and the selecting unit 18 by executing a defragmentation program 13C stored in a memory 15A.

The controller 5 functions as the evaluating unit 19 and the relocating unit 20 by executing a defragmentation program 13D stored in the non-volatile memory 4 (or any other memory) of the storage device 2.

In the fourth embodiment, the relocating unit 20 is provided in the storage device 2. When relocating the data, the relocating unit 20 determines the relocation location, relocates (rewrites) the data, and updates the address conversion data 6.

In the fourth embodiment, the initializing unit 17 or the selecting unit 18 implemented by the processor 14 of the information processing device 3 may notify the storage device 2 of the data (for example, threshold value T used for relocating data) used by the evaluating unit 19 and the relocating unit 20 implemented by the controller 5 of the storage device 2.

The selecting unit 18 transmits the exclusive command for identifying the logical address group of the evaluation target for the storage device 2.

The evaluating unit 19 of the storage device 2 converts the logical address group LG of the evaluation target identified by the information processing device 3 into the physical address group PG by referring to the address conversion data 6 based on the received exclusive command, calculates the parameter value P for the physical address group PG according to the contents of the device data 8, and provides the parameter value P to the relocating unit 20.

The relocating unit 20 of the storage device 2 relocates the physical position of the data corresponding to the logical address group of the evaluation target based on the threshold value T received from the information processing device 3 and the parameter value P calculated by the evaluating unit 19 and updates the address conversion data 6.

In the fourth embodiment described above, the same effect can be obtained by the same operation as in the first embodiment or the second embodiment.

In addition, in the fourth embodiment, it is possible to disperse the process between the information processing device 3 and the storage device 2.

Further, in the fourth embodiment, transmission of the address conversion data 6 from the storage device 2 to the information processing device 3 can be omitted and transmission of the command and the data related to the relocation from the information processing device 3 to the storage device 2 can be omitted.

Each of the example embodiments described above can be freely combined and implemented together or separately. The in some examples various elements described above may be divided into a plurality of different components or each of the elements may be obtained by combining a plurality of similar components and/or sub-components. In addition, each of the various elements can be appropriately modified and positioned.

For example, the function of the initializing unit 17 may be dispersed to the selecting unit 18, the evaluating unit 19, and the relocating unit 20 and each of the selecting unit 18, the evaluating unit 19, and the relocating unit 20 may perform the initialization and obtain data.

For example, the initializing unit 17, the selecting unit 18, and the evaluating unit 19 may be implemented by the processor 14 of the information processing device 3 and the relocating unit 20 may be implemented by the controller 5 of the storage device 2.

While certain embodiments have been described, these embodiments have been presented by way of example only, and are not intended to limit the scope of the present disclosure. Indeed, the novel embodiments described herein may be embodied in a variety of other forms; furthermore, various omissions, substitutions and changes in the form of the embodiments described herein may be made without departing from the spirit of the present disclosure. The accompanying claims and their equivalents are intended to cover such forms or modifications as would fall within the scope and spirit of the present disclosure.

What is claimed is:

1. An information processing device, comprising:
   a processor configured to:
   refer to address conversion data which has a plurality of logical addresses associated with a plurality of physical addresses of a storage device;
   convert the plurality of logical addresses of an evaluation target in the storage device into the corresponding plurality of physical addresses for the evaluation target by referring to the address conversion data;
   calculate an evaluation value indicating a parallel reading performance for the plurality of physical addresses of the evaluation target using a parameter specifying a number of areas of the storage device readable in parallel; and
   issue commands to the storage device to relocate data related to the plurality of logical addresses of the evaluation target if the evaluation value is equal to or greater than a threshold value.

2. The information processing device according to claim 1, wherein the processor is further configured to:
   divide a logical address space of the evaluation target by a unit to be read in parallel from the storage device according to a read command and select the plurality of logical addresses of the evaluation target from a result of the division.

3. The information processing device according to claim 1, wherein the evaluation value represents a degree of dispersion of the plurality of physical addresses of the evaluation target among the number of areas of the storage device.

4. The information processing device according to claim 1, wherein the evaluation value represents a predicted value for a number of non-parallel readings required with respect to the plurality of physical addresses of the evaluation target.

5. The information processing device according to claim 1, wherein the address conversion data is stored in, and obtained from, the storage device.

6. The information processing device according to claim 1, wherein the storage device includes a non-volatile memory in which the address conversion data is stored.

7. The information processing device according to claim 1, wherein the processor is further configured to:
   find another plurality of physical addresses having a higher parallel reading performance than the plurality of physical addresses of the evaluation target, and
   read the data from a location designated by the plurality of physical addresses of the evaluation target and relocate the data to a location designated by the other plurality of physical addresses.

8. The information processing device according to claim 1, wherein the evaluation target is an individual file.

9. The information processing device according to claim 1, wherein the number of areas is equal to a number of planes in the storage device.

10. The information processing device according to claim 1, wherein the parameter is obtained by a defragmentation program previously executed on the processor.

11. A storage device, comprising:
    a non-volatile memory; and
    a controller connected to the non-volatile memory and configured to:
    refer to address conversion data which has a plurality of logical addresses associated with a plurality of physical addresses in the storage device when an evaluation command and the plurality of logical addresses of an evaluation target is received from an external device;
    convert the plurality of logical addresses of the evaluation target into the corresponding plurality of physical addresses of the evaluation target by referring to the address conversion data;
    calculate an evaluation value indicating a parallel reading performance for the plurality of physical addresses of the evaluation target using an internal parameter specifying a number of areas of the storage device readable in parallel;
    find another plurality of physical addresses having a higher parallel reading performance than the plurality of physical addresses of the evaluation target;
    read data from a location designated by the plurality of physical addresses of the evaluation target;
    relocate the data to a location designated by the other plurality of physical addresses; and
    update the address conversion data according to the other plurality of physical addresses to which the data was relocated.

12. The storage device according to claim 11, wherein the non-volatile memory is NAND flash memory.

13. The storage device according to claim 11, wherein the internal parameter matches the number of chips in the non-volatile memory.

14. The storage device according to claim 11, wherein the external device is a host computer.

15. The storage device according to claim 11, wherein the evaluation target is an individual file.

16. A method of storing data in a computer system which includes a storage device having a non-volatile memory and an information processing device connected to the storage device, the method comprising:
- causing one of the storage device or the information processing device to refer to stored address conversion data which has a plurality of logical addresses associated with a plurality of physical addresses;
- converting a plurality of logical addresses of an evaluation target into a corresponding plurality of physical addresses of the evaluation target by referring to the stored address conversion data;
- causing the one of the storage device or the information processing device to calculate an evaluation value indicating a parallel reading performance for the plurality of physical addresses of the evaluation target using a parameter specifying a number of areas of the storage device readable in parallel; and
- relocating the data related to the plurality of logical addresses of the evaluation target when the evaluation value is equal to or greater than a threshold value.

17. The method according to claim 16, wherein a processor in the information processing device calculates the evaluation value.

18. The method according to claim 17, wherein a controller in the storage device calculates the evaluation value.

* * * * *